Figure 3:
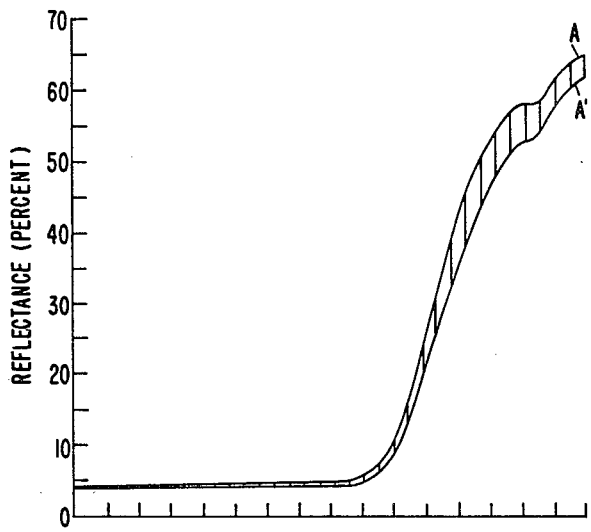

United States Patent [19]

Putney

[11] 4,115,377
[45] Sep. 19, 1978

[54] RUBINE MIXED STRONTIUM-CADMIUM SALTS OF 3-CHLORO-4-METHYL-6-SULFO-PHENYLAZO-HYDROXYNAPHTHOIC ACID

[75] Inventor: Richard Knight Putney, Hudson Falls, N.Y.

[73] Assignee: Hercules Incorporated, Wilmington, Del.

[21] Appl. No.: 764,322

[22] Filed: Jan. 31, 1977

[51] Int. Cl.$^2$ .................. C09D 45/12; C09D 45/22; D06P 1/46; D06P 3/79
[52] U.S. Cl. .................. 260/151; 106/288 Q; 106/301; 260/37 P; 260/42.21; 260/202
[58] Field of Search .................. 260/202, 151; 106/288 Q, 301

[56] References Cited

U.S. PATENT DOCUMENTS

| | | | |
|---|---|---|---|
| 741,029 | 10/1903 | Gley et al. | 260/202 |
| 770,430 | 9/1904 | Herzberg et al. | 260/202 X |
| 842,560 | 1/1907 | Kirchhoff | 260/202 |
| 942,916 | 12/1909 | Konio | 260/202 X |
| 983,486 | 2/1911 | Ernst et al. | 260/202 |
| 1,818,778 | 8/1931 | Alleman | 260/202 |
| 1,951,298 | 3/1934 | Wagner | 260/202 |
| 2,117,860 | 5/1930 | Siegel | 260/202 |
| 2,189,806 | 2/1940 | Lang et al. | 260/202 X |
| 2,225,665 | 12/1940 | Siegel | 260/202 |
| 2,229,049 | 1/1941 | Dahlen et al. | 260/201 |
| 2,396,328 | 3/1946 | Kvalnes et al. | 260/151 |
| 2,694,055 | 11/1954 | Ludwig et al. | 260/151 |
| 2,765,300 | 10/1956 | Hein et al. | 260/151 |
| 2,774,027 | 5/1956 | Struve et al. | 260/202 UX |
| 2,821,525 | 1/1958 | Waitkins et al. | 260/151 |
| 3,036,059 | 5/1962 | Erhardt et al. | 260/149 |

FOREIGN PATENT DOCUMENTS

| | | | |
|---|---|---|---|
| 512,203 | 4/1955 | Canada | 260/202 |
| 41-17,754 | 11/1966 | Japan | 260/202 |
| 480,421 | 12/1969 | Switzerland | 260/202 |

OTHER PUBLICATIONS

Dobrovolyn, Chemical Abstracts, vol. 78, #137932k (1973).
Dobrovolny et al., Chemical Abstracts, vol. 80, #72062w (1974).
Saito et al., Index Chemicus, vol. 28, #89798 (1968).

*Primary Examiner*—Floyd D. Higel
*Attorney, Agent, or Firm*—Hazel L. Deming

[57] ABSTRACT

Mixed strontium-cadmium salts of the monoazo dyestuff

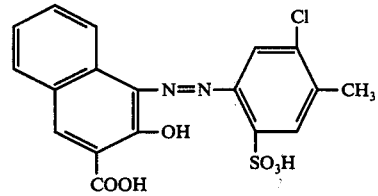

having a gram atom ratio of strontium to cadmium from 1:1 to 5:1 are described. The mixed salts give red pigments which have excellent color and possess good lightfastness and heat stability.

3 Claims, 6 Drawing Figures

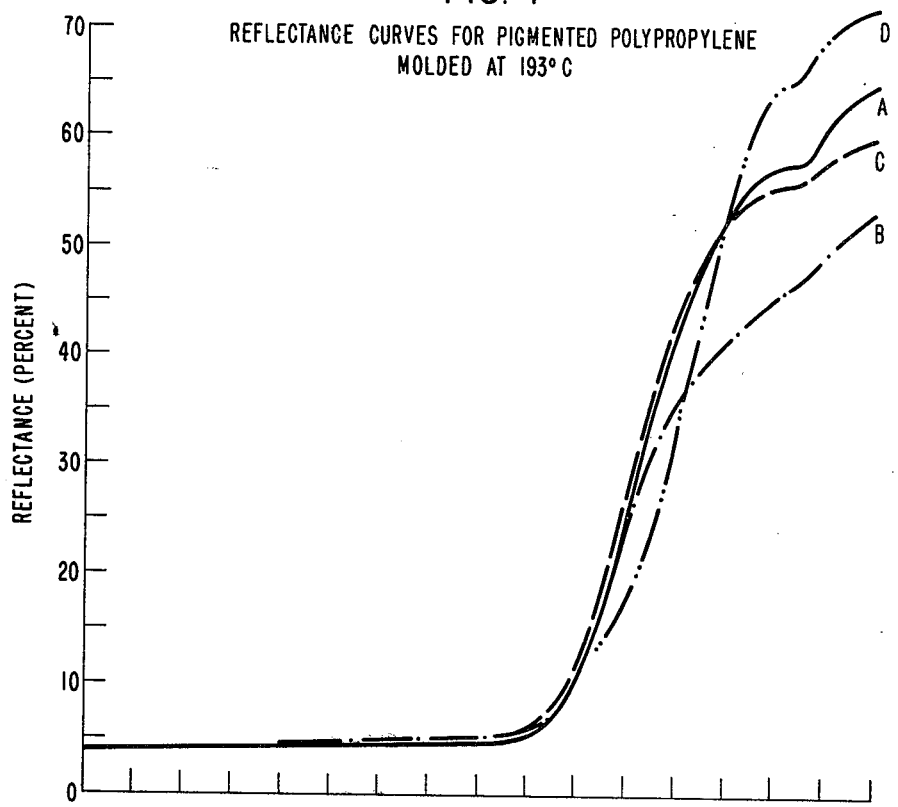
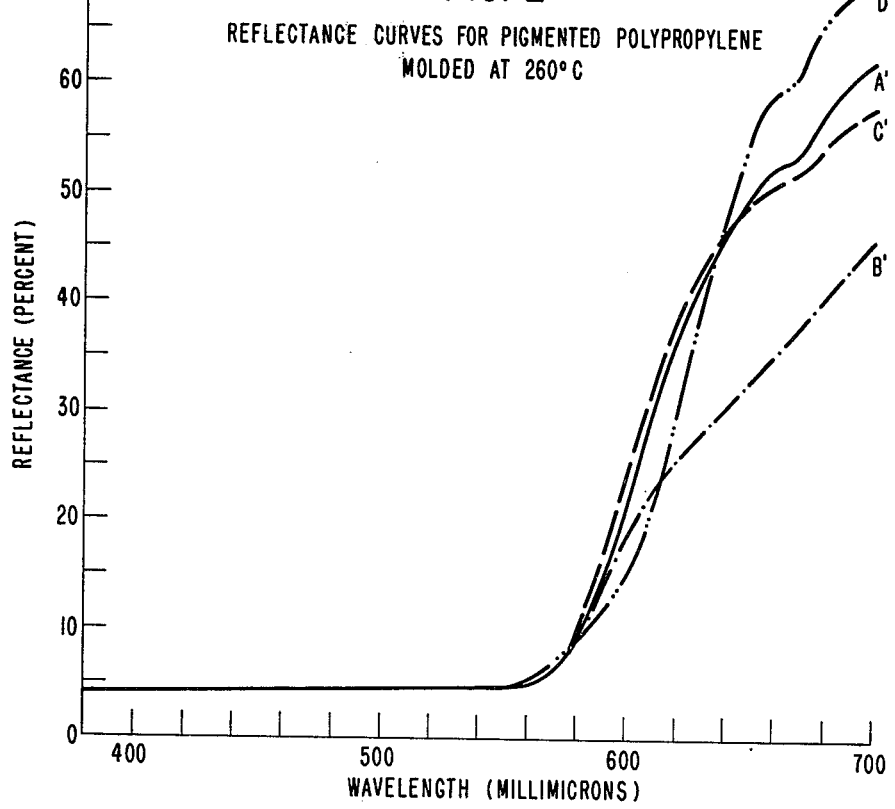

REFLECTANCE CURVES FOR PIGMENTED POLYPROPYLENE
MOLDED AT 193°C AND 260°C

RUBINE MIXED STRONTIUM-CADMIUM SALTS OF 3-CHLORO-4-METHYL-6-SULFOPHENYLAZO-HYDROXYNAPHTHOIC ACID

This invention relates to certain mixed strontium-cadmium salts of the monoazo dyestuff of the formula

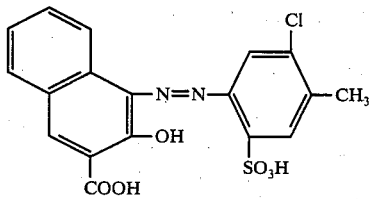

and more particularly to the mixed strontium-cadmium salts having a gram atom ratio of strontium to cadmium ranging from 1:1 to 5:1, and pigments thereof.

The strontium salt or lake of the monoazo dyestuff formed by coupling 2-hydroxy-3-naphthoic acid with diazotized 3-chloro-4-methylaniline-6-sulfonic acid gives a bluish-red pigment which is known as strontium rubine. The pigment is highly transparent, resistant to bleeding in solvents and resistant to the destructive action of light and weather in both enamel and lacquer finishes. It also has excellent color value and is relatively inexpensive to manufacture as compared with other red organic pigments. The strontium rubine pigment, however, tends to darken or otherwise change color at elevated temperatures and does not possess sufficient heat stability at the temperatures required for the processing of such thermoplastics as polyethylene and polypropylene to warrant broad utility as a red pigment.

The cadmium and manganese salts of the above monoazo dyestuff are also known but have gained little popularity as pigments. The cadmium salt is yellower in color and has poor lightfastness. The manganese salt on the other hand is maroon in color, has poor heat stability, and likewise is not important.

Attempts to overcome the deficiencies of the strontium rubine pigments by varying the substituents on the aniline nucleus of the diazotized component of the dyestuff have also not been completely successful. Usually, any improvement in light or heat stability is associated with a change or shift in color which offsets any advantages realized by the variations.

Now, in accordance with this invention, it has been found that the heat stability of strontium rubine pigments can be improved without detriment to the excellent color and lightfastness properties of the pigment by substituting cadmium for a specified portion of the strontium component of the pigment. That improved heat stability could be realized in this manner without affecting the other desirable properties of the pigment was indeed surprising since physical mixtures or blends of a pure strontium and a pure cadmium rubine pigment do not offer the same advantages.

Accordingly, the present invention relates to a water-insoluble strontium-cadmium salt of the azo dyestuff of the formula

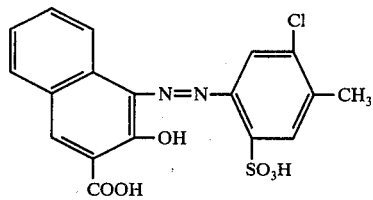

said salt having a gram atom ratio of strontium to cadmium ranging from 1:1 to 5:1, and pigments of said salts.

In the accompanying drawings

Figure 4:
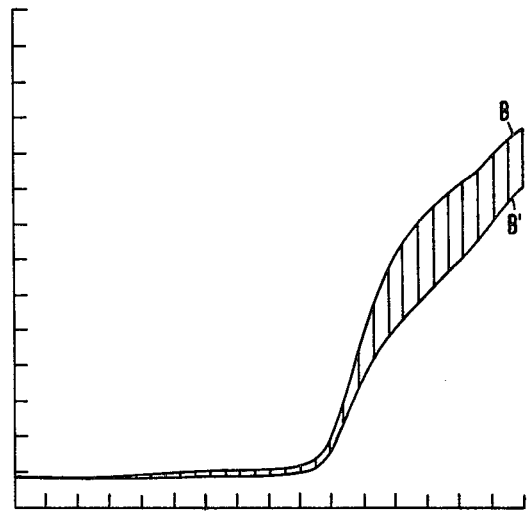
Figure 5:
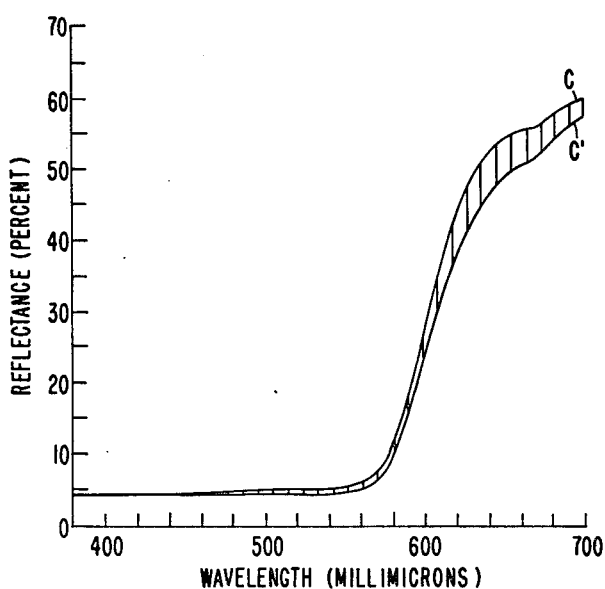
Figure 6:
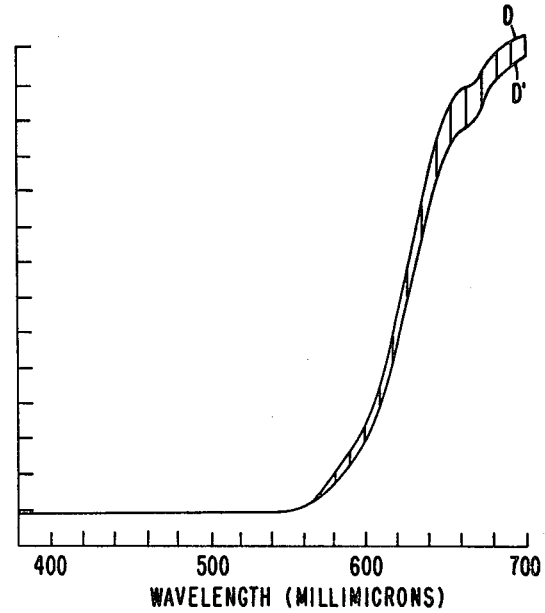

FIG. 1 is a graphical comparison of the reflectance curves for four pigmented samples of polypropylene molded at 193° C., the straight line curve A representing the sample containing the pigment of Example 1, the broken line curve B (--) representing the sample containing a strontium rubine control pigment, the broken line curve C "- -" representing the sample containing the pigment of Example 2 and the broken line curve D "---" representing the sample containing a cadmium rubine control pigment;

FIG. 2 is a similar comparison of the reflectance curves for the same four pigmented samples of polypropylene, except that the samples were molded at 260° C., the straight line curve A' representing the sample containing the pigment of Example 1 and the broken line curves B' "---", C' "- -", and D' "---" representing the samples containing the strontium rubine control pigment, the pigment of Example 2 and the cadmium rubine control pigment, respectively; and FIGS. 3 to 6 are graphical representations of the change in total reflectance (shaded areas) which occurs when the molding temperature of the pigmented polypropylene samples is elevated from 193° C. to 260° C., the shaded portion of FIG. 3 being the area between reflectance curves A and A', the shaded portion of FIG. 4 being the area between reflectance curves B and B', the shaded portion of FIG. 5 being the area between reflectance curves C and C' and the shaded portion of FIG. 6 being the area between reflectance curves D and D'.

The monoazo dyestuff from which the water-insoluble, mixed strontium-cadmium salts of this invention are formed has in the free acid form the probable formula

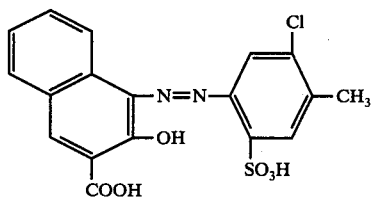

The dyestuff is well-known and is produced conventionally by coupling 2-hydroxy-3-naphthoic acid with diazotized 3-chloro-4-methylaniline-6-sulfonic acid. Preferably the coupling reaction is carried out by gradually adding a cold aqueous slurry of the diazonium salt of 3-chloro-4-methylaniline-6-sulfonic acid to an agitated alkaline solution of 2-hydroxy-3-naphthoic acid at about 10° to about 20° C., and continuing agitation until coupling is complete and the slightly soluble disodium or other alkali salt of the dyestuff results, preferably at a pH of about 10.5 to about 11.5.

Conversion of the dyestuff to its water-insoluble mixed strontium-cadmium salts is preferably carried out by adding the strontium and cadmium salts to the mixture in which the dyestuff was formed after completion of the coupling reaction or to an aqueous dispersion of the recovered dyestuff. Since conversion of the dyestuff to its mixed strontium-cadmium salt will not go to completion in the presence of free mineral acids, a sufficient amount of an alkaline compound must be available in the reaction medium at this stage to combine with any free acid present in the disodium or other alkali salt. Usually, maintaining the pH at greater than about 10.0 before addition of the salts will insure a final pH within the desired range of about 6.0 to about 7.0.

The strontium and cadmium salts can be added to the aqueous dispersion of the dyestuff separately or in combination and the relative proportions of each will depend upon the specific atomic ratio desired in the mixed salt. Usually, it is advantageous to employ water-soluble salts such as the nitrate and chloride and to add the salts as a solution containing both the strontium and cadmium salts or to add the solution of the cadmium salt first followed by the solution of the strontium salt. The total amount of strontium and cadmium salts used should, of course, be sufficient to combine with the acid groups of the dyestuff and usually will provide at least a slight excess, for example, about 10% or more. Following or prior to addition of the strontium and cadmium salts, the dyestuff suspension is preferably heated to at least 60° C., preferably about 90° to 100° C., and the resulting slurry of the mixed salts of the dyestuff is held thereat for about 15 to 45 minutes to perfect particle size and aid recovery. The mixed strontium-cadmium salt of the dyestuff is then recovered conventionally, usually by filtration, washing and drying at about 80° to about 85° C.

The mixed strontium-cadmium salts of this invention contain a gram atom ratio of strontium to cadmium within the range of 1:1 to 5:1 and preferably 2:1 to 3:1. Within these ranges it has been found that the mixed salt is a beautiful bright red pigment exhibiting excellent lightfastness and heat stability when dispersed in plastics at temperatures up to about 280° C.

The pigments are useful for coloring a wide variety of materials such as enamels, lacquers, paints and plastics but are particularly useful for coloring the fiber and film-forming polymers such as the polyolefins and poly(vinyl chloride). Intimate dispersions of the pigment in plastics can be obtained conventionally, as by milling, dispersing or flushing techniques. Preferably the pigment is compounded in aqueous medium with the plastic in the presence of a small amount of a water-soluble cadmium salt to assure maintenance of the desired strontium to cadmium ratio.

The invention is further illustrated by the following examples wherein all parts and percentages are by weight unless otherwise specified.

EXAMPLE 1

To an agitated solution of 26.5 parts of sodium carbonate in 1000 parts of water at 80°–90° C. were added 110.8 parts of 3-chloro-4-methylaniline-6-sulfonic acid and the mixture was agitated with heating until a clear solution was obtained. Next 129 parts of 32% aqueous hydrogen chloride were added all at once with agitation, the resulting slurry was cooled to 6° C. with crushed ice, and a solution of 35 parts of sodium nitrite in 100 parts of cold water was added. The resulting mixture was agitated at 10° C. for 30 minutes, after which time the excess nitrous acid was used up by the addition of small portions of 3-chloro-4-methylaniline-6-sulfonic acid.

The cold slurry of the diazonium salt produced above was added gradually at a uniform rate over a 10 minute period to an agitated dilute solution of 2-hydroxy-3-naphthoic acid at 15° C., the solution having been previously prepared by dissolving 100 parts of the naphthoic acid and 51 parts of sodium hydroxide in 750 parts of water at 50° C., and diluting and cooling the solution with water to 6000 parts by volume at 15° C. Agitation was continued for 10 minutes, during which time a solution of 4 parts of sodium abietate in 150 parts of hot water was added. The resulting slurry was diluted with water, heated to 25° C. and the pH was adjusted to 10.0 with 70% acetic acid, the volume of the slurry being 12,000 parts at 25° C.

The diluted slurry was heated to 68° C. at a rate of 1° C./minute with agitation, after which a solution of 75.0 parts of technical grade anhydrous strontium nitrate and 77. 6 parts of reagent grade cadmium nitrate tetrahydrate in 500 parts of water was added uniformly over a ten-minute period. The resulting dark red slurry was next heated at 1° C./minute to 97° C., maintained at that temperature for 15 minutes, and cooled to 75° C. with cold water. The red product was recovered by filtration, washed and isolated as a filter cake containing about 28% solids. A portion of the filter cake was dried at 82° C. for 24 hours, and gave a bright red pigment containing (by analysis) strontium and cadmium in a gram atom ratio of 2.37:1.

1780 Parts of the above filter cake (500 parts, dry weight) were stirred with sufficient water containing 60.5 parts of the coconut oil ester of sodium isethionate and 5 parts of 37% aqueous formaldehyde at a pH of 7.5 to 8.5 to give a pigment content of 25% and a total solids content of 28%. The resulting mixture was homogenized by passing it once through a TriHomo mill and then twice through a Gaulin mill at 4500–5000 psi. The homogenized dispersion and 1100 parts of flake polypropylene were next added to a vessel containing a mixture of 600 parts of water, 400 parts of an aliphatic hydrocarbon (boiling point range of 120°–140° C.), 400 parts of low molecular weight polyethylene (density of 0.91 and drop softening point of 102° C.) and 108 parts of cadmium nitrate tetrahydrate at 60° C. The vessel contents were heated to 88° C. with stirring, following which time 50 parts of dehydroabietylamine acetate as a 25% aqueous solution were added, ¾ of it being added all at once and the remaining ¼ being added uniformly over a 10 minute period to control the growth rate of granules and maintain the pH at 5.0 to 6.0. Heating was continued slowly with agitation to 94° C. to remove most of the hydrocarbon solvent and harden the resulting granules, at which point the batch was cooled to 60° C. by dilution with cold water. The cooled batch was filtered through a 100 mesh screen to isolate the product and the product was washed with cold water and dried at 93° C. The granular product was a concentrate containing 25% of pigment.

The above pigment concentrate was mixed with additional polypropylene to provide a pigment level of 0.5% by four-fold extrusion at 193° C. and the extrudate was molded into 2 sets of 20 mil thick plaques in a Carver Press, one set being molded at 193° C., and the other set being molded at 193° C. and then heated for an additional 10 minutes in the press at 260° C. Both sets of plaques were examined spectrophotometrically using the CIE tristimulus system of color measurements described in "Principles of Color Technology", by Billmeyer and Saltzman, pages 31–45, Interscience Publ. Co., N.Y. (1966). Color differences between the plaques molded at 193° C. (control) and those heated at 260° C. (sample) were calculated in MacAdam units from the measurements using the equation $$E = \sqrt{\Delta C^2 + \Delta L^2}$$

where
- $E$ = the overall color difference of the sample,
- $\Delta C$ = difference in chromaticity (hue and saturation) between sample and control and
- $\Delta L$ = difference in lightness (+) or darkness (−) on a gray scale between sample and control.

For purposes of comparison, a pure strontium rubine pigment was prepared and evaluated according to the procedure of this example with the exceptions that no cadmium nitrate was added to the coupling reaction slurry, the amount of strontium nitrate was increased to 126 parts and no cadmium nitrate was used in formation of the pigment concentrate. Heat-induced color value differences obtained on the plaques colored with the pure strontium rubine control pigment and plaques colored with the strontium-cadmium pigment of this example are tabulated below.

| Color Differences in MacAdam Units | Pigment | |
|---|---|---|
| | Example 1 | Strontium Rubine Control |
| Lightness, ΔL | −6.7 | −8.6 |
| Chromaticity, ΔC | 2.3 | 7.2 |
| Overall Color, E | 7.2 | 11.2 |

Analyses of the data of the Table demonstrate that the pigment of this example exhibits superior heat stability as compared with the strontium rubine control pigment. The observations are further supported by the reflectance curves shown in the accompanying FIGS. 1 to 4. The curves of these Figures are the reflectance readings at various wavelengths ranging from 380 to 700 millimicrons for the pigmented polypropylene samples molded at 193° C. and at 260° C., respectively, as a percent of the reflectance for a pure white barium sulfate standard, the readings being made with a General Electric recording spectrophotometer. Specifically, curve A of FIGS. 1 and 3 and curve A' of FIGS. 2 and 3 are the reflectance readings for the polypropylene sample containing 0.5% of the pigment of Example 1 and molded at 193° C. and 260° C., respectively, and curve B of FIGS. 1 and 4 and curve B' of FIGS. 2 and 4 are the readings for the polypropylene sample containing 0.5% of the strontium rubine control pigment similarly molded. More specifically, a comparison of curves A and A' (see shaded area of FIG. 3) shows that the pigment of this example retains at 260° C., in the region of 700 millimicrons, approximately 95% of the reflectivity obtained at 193° C. whereas a comparison of curves B and B' (see shaded area of FIG. 4) shows that the strontium rubine control pigment retains only about 87% of the reflectivity in the same region. Further, a comparison of the total shaded area of FIG. 3 with that of FIG. 4 confirms that improved heat stability is achieved by the practice of this invention.

The concentrate containing the pigment of this example and the concentrate containing the strontium rubine control pigment were each let down to a 0.5% pigment level in polypropylene, and spun into monofilaments at 260°–280° C. and collected as puffs. Color comparisons showed that the puff containing the pigment of this example was slightly less blue than the puff containing the strontium control pigment. When the puffs were exposed in a Weather-O-Meter for 300 hours, very slight fading occurred, indicating that the lightfastness of the pigment of this example was very good and essentially equal to that of the control.

EXAMPLE 2

The procedure of Example 1 was repeated except that following heating of the diluted slurry to 68° C., 108 parts of anhydrous strontium nitrate and 153 parts of cadmium nitrate tetrahydrate were used and the strontium nitrate and cadmium nitrate were added to the slurry as separate solutions in 400 parts of water, the cadmium nitrate solution being added first over a period of 5 minutes followed by the strontium nitrate solution over the next 5 minute period. The dried filter cake gave a bright red pigment containing strontium and cadmium rubine pigment in the gram atom ratio of 2.8:1.

When the pigment of this Example was dispersed in polypropylene and molded into plaques according to the procedure of Example 1, the color values (differences in MacAdam units) were: Lightness (ΔL) of −6.3; chromaticity (ΔC) of 1.9 and overall color (E) of 6.7. The reflectance curves for polypropylene containing 0.5% of the pigment of this example are shown by curve C of FIGS. 1 and 5 and curve C' of FIGS. 2 and 5. Comparisons of curve C with B, curve C' with B' and the shaded area of FIG. 5 with that of FIG. 4 confirm that improved heat stability without significant shift of hue is achieved by the practice of this invention.

For purposes of comparison, the procedure of this example was repeated except that no strontium nitrate was added to the diluted slurry and the amount of cadmium nitrate was increased to 185 parts, the resulting pigment being an essentially pure cadmium rubine. The reflectance readings for polypropylene samples containing 0.5% of the cadmium rubine control pigment and molded at a temperature of 193° C. are shown as curve D in FIGS. 1 and 6, and the readings for the samples molded at 260° C. are shown as curve D' of FIGS. 2 and 6. As is readily evident by a comparison of the reflectance curves B, C and D of FIG. 1 and of curves B', C' and D' of FIG. 2, improved heat stability without significant hue shift is obtained with the pigment of this example. A comparison of curves C and C' (see shaded area of FIG. 5) with curves D and D' (shaded area of FIG. 6) and curves B and B' (shaded area of FIG. 4) further confirms that improved heat stability is achieved by the practice of this invention.

When the pigment of this example and the cadmium rubine control pigment were dispersed in polypropylene, spun into puffs and evaluated according to the procedure of Example 1, the puff containing the pigment of this example was significantly redder and much less yellow than the puff containing the cadmium control pigment. Following 300 hours of Weather-O-Meter exposure, the puff containing the pigment of this example exhibited very slight fading indicating that the lightfastness was very good. On the other hand, considerable fading was noted for the puff containing the cadmium control pigment and its lightfastness was rated as poor.

What I claim and desire to protect by Letters Patent is:

1. A water-insoluble strontium-cadmium salt of the azo dyestuff of the formula

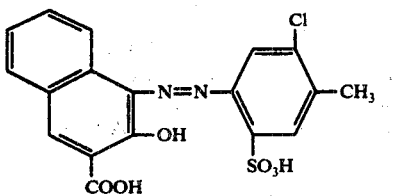

said salt having a gram atom ratio of strontium to cadmium ranging from 1:1 to 5:1.

2. The salt of claim 1 wherein the gram atom ratio of strontium to cadmium ranges from 2:1 to 3:1.

3. A red pigment exhibiting good lightfastness and heat stability in plastics at temperatures up to about 280° C. and consisting essentially of the salt of claim 1.